United States Patent
Polido et al.

(10) Patent No.: US 11,207,786 B1
(45) Date of Patent: Dec. 28, 2021

(54) CONCENTRIC SUCTION CUP ARRAY FOR END-OF-ARM TOOL

(71) Applicant: Amazon Technologies, Inc., Seattle, WA (US)

(72) Inventors: Felipe De Arruda Camargo Polido, Seattle, WA (US); Noah Wieckowski, Seattle, WA (US); Scott Hopkinson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 20 days.

(21) Appl. No.: 16/201,582

(22) Filed: Nov. 27, 2018

(51) Int. Cl.
  *B25J 15/06*  (2006.01)
  *B65G 47/91*  (2006.01)
  *B25J 15/00*  (2006.01)

(52) U.S. Cl.
  CPC ....... *B25J 15/0683* (2013.01); *B25J 15/0052* (2013.01); *B65G 47/91* (2013.01)

(58) Field of Classification Search
  CPC .......... B25J 15/0052; B25J 15/0616; B25J 15/0683; B65G 47/91; B65G 47/918; B66C 1/0243
  USPC .............................................. 294/2, 185, 65
  See application file for complete search history.

(56) References Cited

U.S. PATENT DOCUMENTS

| | | | | |
|---|---|---|---|---|
| 2,783,078 A * | 2/1957 | Billner | ......... | B66C 1/0212 294/65 |
| 4,355,936 A * | 10/1982 | Thomas | ......... | B65B 23/08 414/796.2 |
| 5,024,575 A * | 6/1991 | Anderson | ......... | B65G 47/90 294/2 |
| 5,752,729 A * | 5/1998 | Crozier | ......... | B66C 1/0218 294/2 |
| 5,863,086 A * | 1/1999 | Christenson | ......... | B65F 3/04 294/106 |
| 7,017,961 B1 * | 3/2006 | Parnell | ......... | B25J 15/0616 294/188 |
| 7,481,472 B2 * | 1/2009 | Cawley | ......... | B65G 57/24 294/2 |
| 8,132,835 B2 * | 3/2012 | Ban | ......... | B25J 15/0616 294/183 |
| 8,414,042 B2 * | 4/2013 | Landes | ......... | B65G 47/90 294/106 |
| 9,156,570 B2 * | 10/2015 | Lomerson, Jr. | ......... | B25J 15/0052 |
| 2014/0197652 A1 * | 7/2014 | Wang | ......... | B25J 15/0009 294/185 |
| 2016/0089793 A1 * | 3/2016 | Truebenbach | ......... | B25J 15/0616 324/750.25 |
| 2016/0114482 A1 * | 4/2016 | Lessing | ......... | B25J 15/10 606/130 |

* cited by examiner

Primary Examiner — Dean J Kramer
(74) Attorney, Agent, or Firm — BakerHostetler

(57) ABSTRACT

An end-of-arm-tool attachment deploys gripper arms to help stabilize picked items. The arms rotate around the lower body of the tool and, depending on the size of the item, will either support the item from below or help reduce swinging by applying pressure to the sides/top. When not in use, the arms are stowed on the upper body of the tool to minimize potential for collision and to provide a smaller profile for maneuverability.

18 Claims, 13 Drawing Sheets

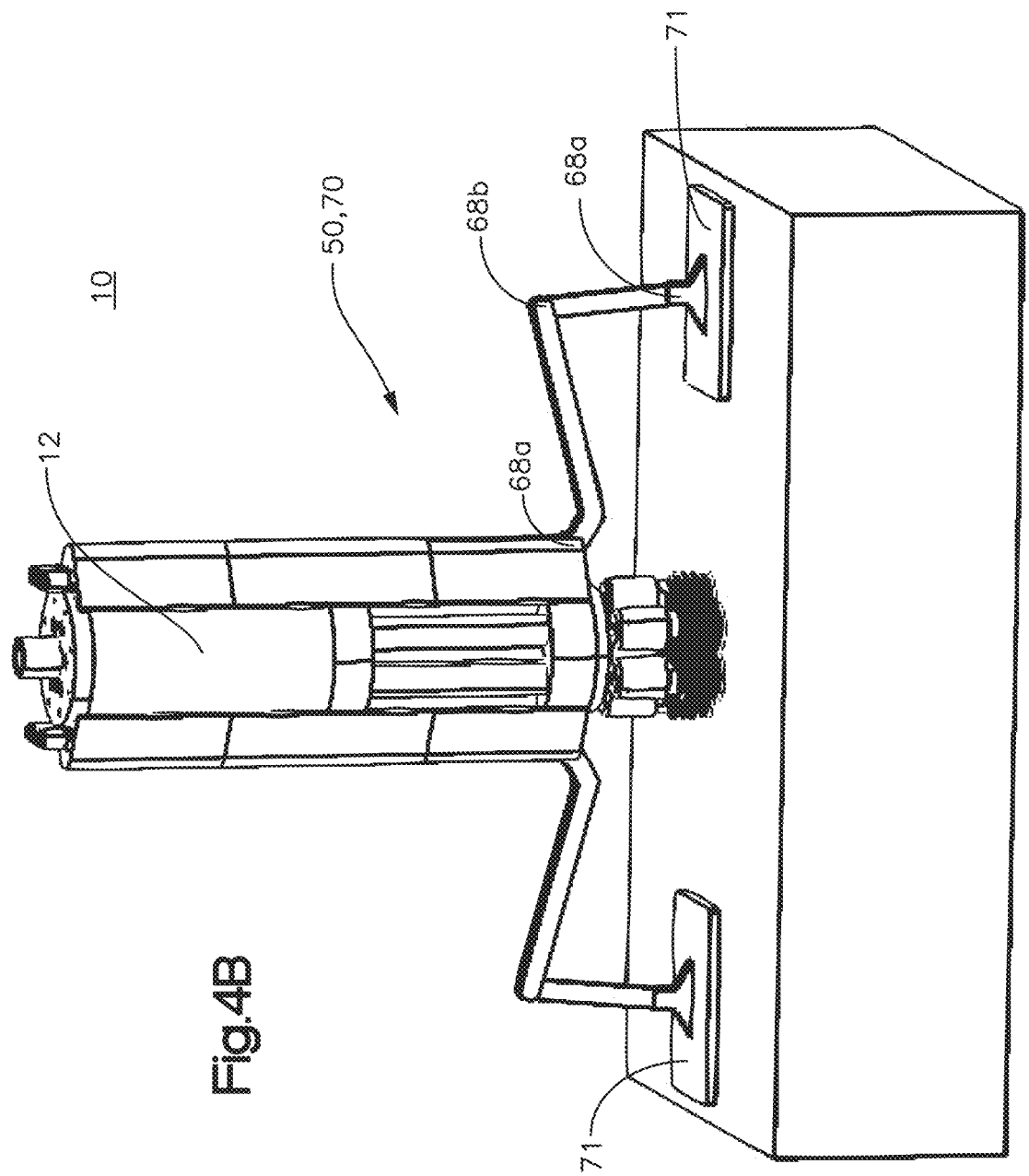

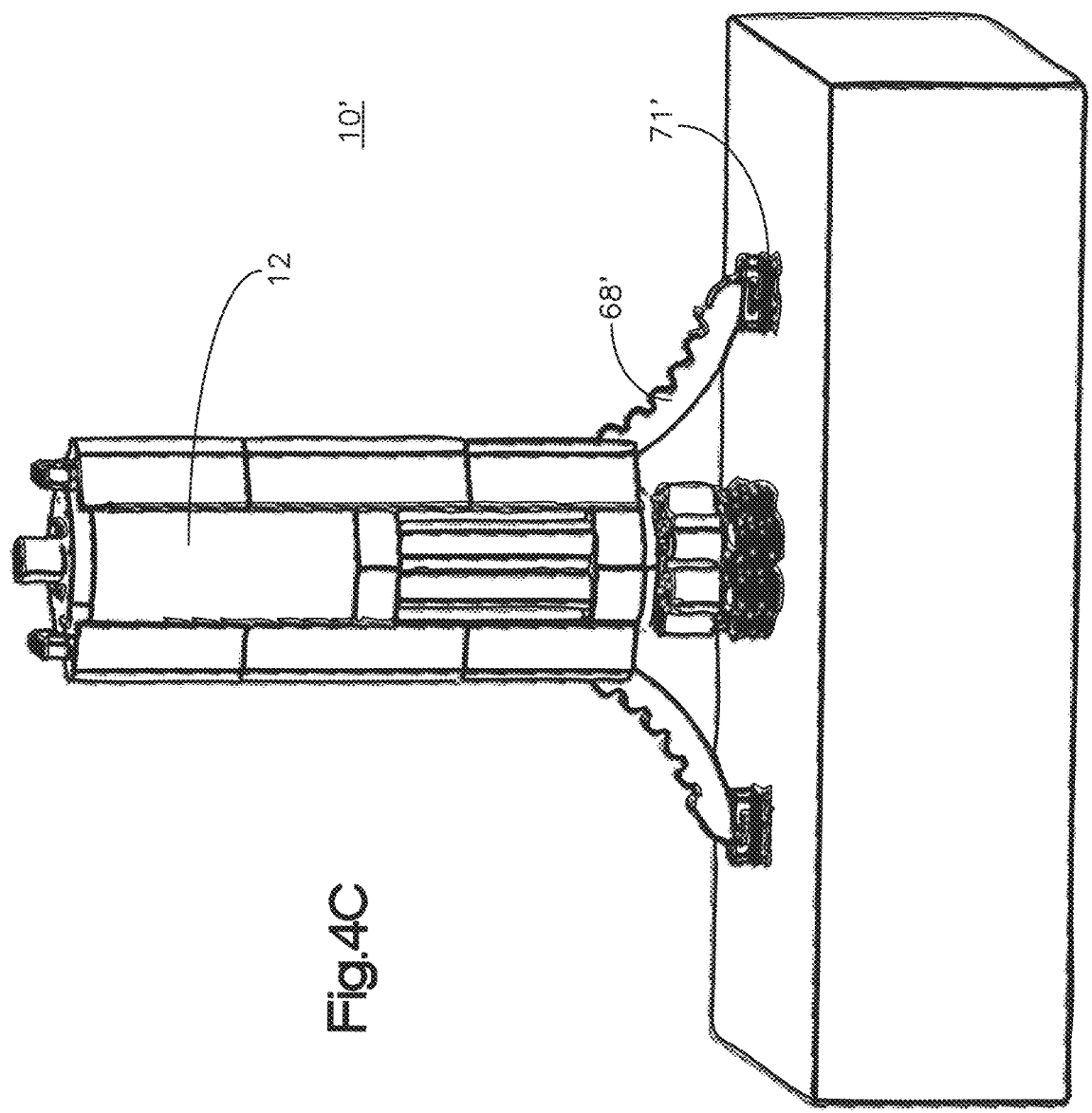

CONCENTRIC SUCTION CUP ARRAY FOR END-OF-ARM TOOL

BACKGROUND

The present invention relates to automation, and more particularly to tools for engaging and lifting items via vacuum.

The robotics field has developed many tools for engaging and lifting items at the end of an end effector. For example, end effectors sometimes employ suction cups for engaging a surface of an item and using a negative or suction pressure or vacuum to engage and lift the item.

Suction cup end of arm tools have some limitations, as the force created by the suction cup is limited by the magnitude of the negative pressure and suction cup area. For example, after a suction-based end-of-arm-tool has picked an item, the item in some circumstances be sheared off from the suction cup, such as when the arm performs a high lateral acceleration.

BRIEF DESCRIPTION OF THE DRAWINGS

FIG. 4B is a view of the EOAT of FIG. 4A with auxiliary arms deployed and engaged with a cuboid box to stabilize the box;

FIG. 4C is a view of an alternative EOAT with soft auxiliary arms deployed and engaged with a cuboid box to grip and stabilize the box;

DETAILED DESCRIPTION OF ILLUSTRATIVE EMBODIMENTS

Figure 1:
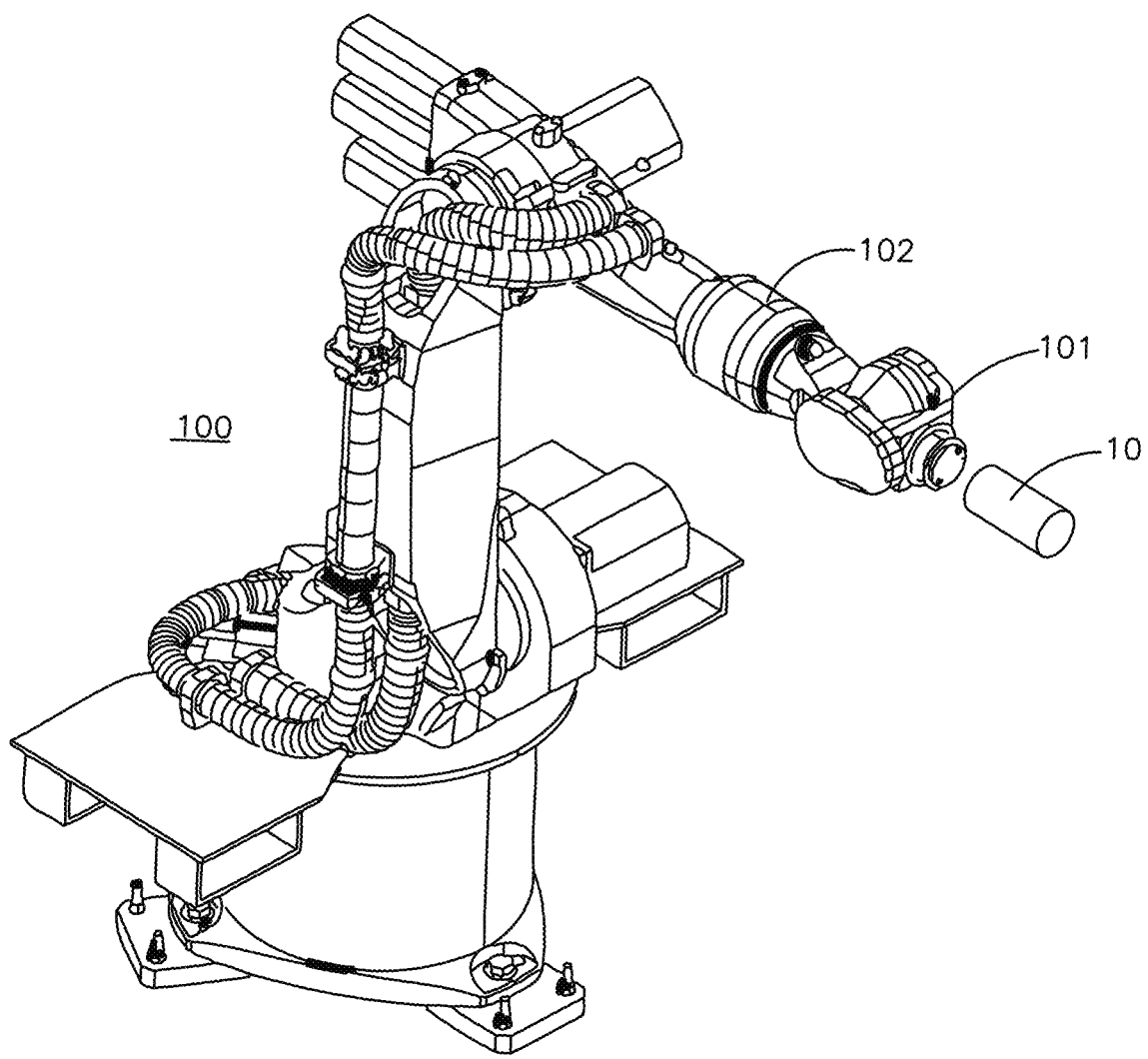
FIG. 1 is a robot of the type that may employ the stabilizing features of the present invention.

An end-of-arm-tool attachment deploys gripper arms that are adapted to stabilize picked items and/or aid in lifting the items. The arms maneuver around the lower body of the tool and, depending on the size of the item, will either support the item from below or help reduce swinging by applying pressure to the sides and/or the top. For unwrapped picking books, which do not have a rigid structure, the arms can prevent or inhibit the book from opening at the spline. When not in use, the arms are stowed on the upper body of the tool to minimize potential for collision with other items or structures such as tote sidewalls.

The suction cup is adapted to lift some items while the linkage of the auxiliary arm assembly is in the retracted position, and in other circumstances the auxiliary arms are deployed to stabilize the item on the suction cup.

The suction cup can be any type, such as a conical or flared profile, bellows-type, or the like. As illustrated in the figures, the EOAT includes concentric rings of suctions cups. The present invention also encompasses a single suction cup gripper at the end of the EOAT.

The auxiliary assemblies can be opposing and each one of the linkages includes an upper arm link pivotally connected to a lower arm link; the gripping element being coupled to a distal end of the lower arm link. Further, any number of auxiliary arms are contemplated, such as two opposing arms as illustrated in the figures, three arms preferably equidistantly spaced apart (that is, at 120 degree intervals, four arms that correspond to the four sides of a cuboid item, among other possibilities depending on the particular use.

In the EOAT of the figures, the auxiliary arm assemblies are configured to engage vertical faces of a box when the EOAT engages a box. When the EOAT engages a book, a first one of the auxiliary arm assemblies can engage a top side of the book and a second one of the auxiliary arms can engage an underside of the book. In other configurations, both the gripper elements on the arms engage a topside of a book or other item. The gripping element can be a flat pad, one or more suction cups coupled to a vacuum source, or other element. FIG. 4C illustrates a suction cup 71' at the end of the auxiliary arm.

A method of lifting an item by a robotic end-of-arm-tool (EOAT), includes: positioning the EOAT relative to an item; engaging the item with a suction cup gripper at a distal end of the EOAT; and deploying a pair of linkages of auxiliary arm assemblies from a retracted position to an engaged position in which gripper elements at distal ends of linkages engage and stabilize the item.

A retracting step can be performed after the deploying step, the retracting step including moving the linkage toward the retracted position via the actuator. If the item is a book, the deploying step includes each one of a first one of the gripper elements and the suction cup gripper engaging a topside of the book, and a second one of the gripper elements engaging an underside of the book. If the item is a cuboid, the deploying step includes the gripper elements engaging opposing side faces of the cuboid.

FIG. 1 illustrates a six axis robot 100 of the type that can employ and end-of-arm-tool 10 having auxiliary arm structure and function, as described herein, an EOAT interface 101 at the end of an arm 102. Other systems for positioning EOAT 10, such as a gantry, collaborative robot, or other systems may be employed. FIGS. 2 through 6 illustrate and EOAT 10 having an EOAT body 12 and a pair of auxiliary arm assemblies 50. EOAT body includes a structural housing or body 14, a center suction cup assembly 20 and a ring 30 or outer suction cups assemblies.

Figure 2:
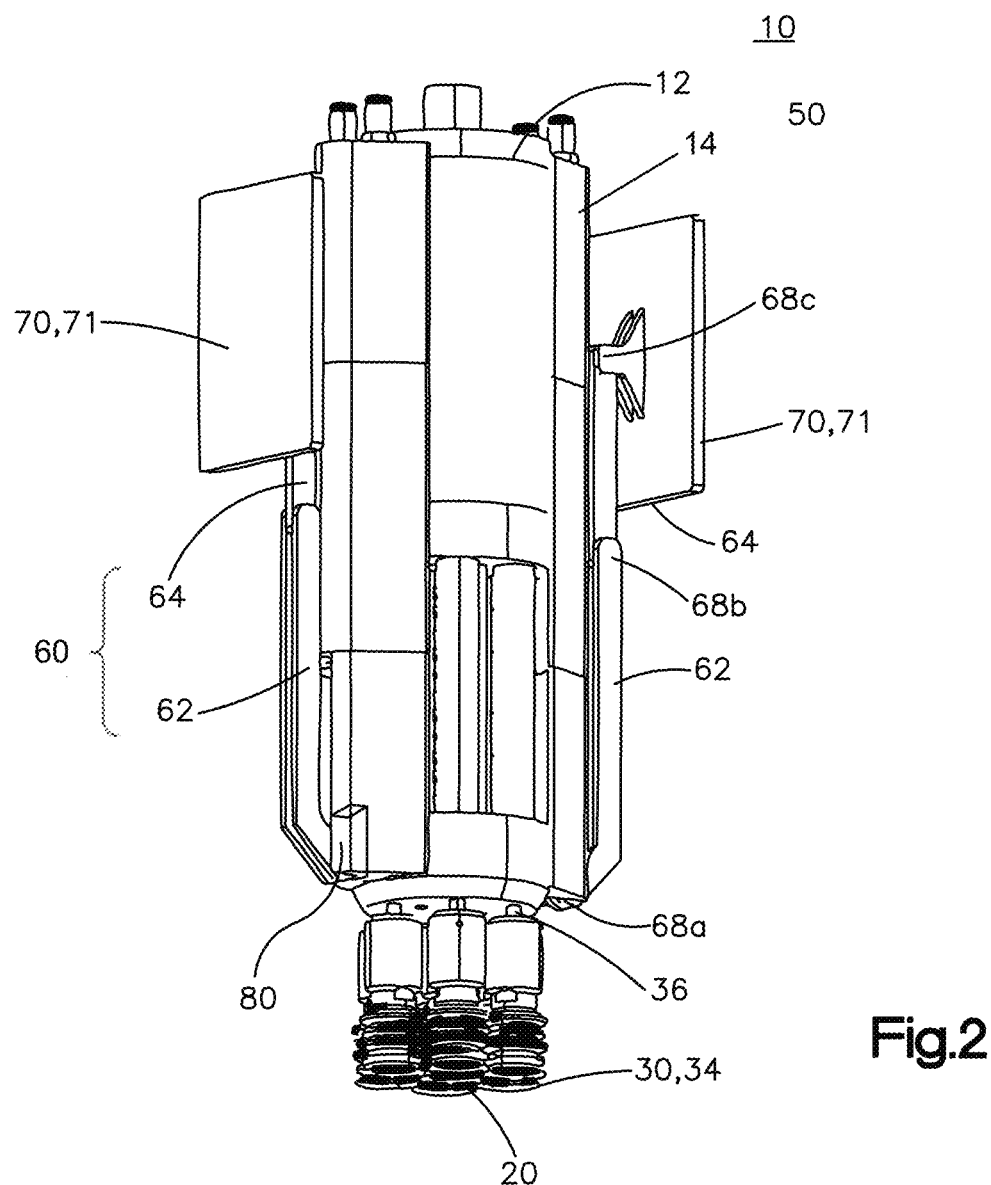
FIG. 2 is a perspective view of an embodiment of an end-of-arm-tool (EOAT) having and embodiment of auxiliary arms in a retracted position.

Center suction cup assembly 20 includes one or more suction cups 24 at the distal end of a tube 26 that can transmit vacuum to suction cup 24 and extend or retract suction cup 24, as explained more fully below. Each one of outer suction cup assemblies 30 includes a suction cup 34 at the distal end of a tube 36 that can transmit vacuum to suction cup 34 and extend or retract suction cup 34, as explained more fully below. A center suction cup 24 and ring of suction cups 34 are illustrated in FIG. 2, and the present invention encompasses any number of suction cups in any configuration. For example, the present invention encompasses a single suction cup at the center of the EOAT's distal end. Moreover, other type of grippers, such as magnetic, adhesive, electrostatic, and the like, are contemplated in place or in addition to the suction cups gripper.

Preferably, the auxiliary arm assemblies 50 are identical but opposite hand, although asymmetrical configurations are contemplated, depending on the intend use. Thus, common reference numbers are used to refer to each one of the assemblies 50. Each auxiliary arm assembly 50 includes a linkage 60 and a gripper element 70. Each linkage 60, in the embodiment of the figures, includes a proximal or upper arm 62 and a distal or lower arm 64. The proximal end of upper arm 62 is coupled to EOAT body 12 at a pivot 68a. The distal end of upper arm 62 is attached to the proximal end of lower arm 64 at a pivot 68b, and the distal end of lower arm 64 is attached to gripper element 70 at a pivot 68c.

An actuator 80, which is shown schematically in the FIG. 2, can deploy and retract linkages 60. Actuator 80 creates a torque about proximal pivot 68a. Preferably pivots 68b and 68c are not actuated, and other configurations are contemplated. For not limiting example, the actuator 80 can be a linear actuator, a rotary actuator, a pneumatic actuator, an electric actuator, and a cable means. Examples of linear actuators include mechanical linear actuators such as lead screws or ACME screws relative to which a portion of upper arm 62 may move. The linear actuator may also be a pneumatic actuator, such as a pneumatic cylinder, or any other type of linear actuator. The rotary actuator can be any type, such as a servo motor, stepper motor, or the like, that provide a torque to upper arm 62a about proximal pivot 68a. A cable drive, belt drive, pneumatic bladder, and other structures may also be employed. The present invention is not intended to be limited to the actuation, and persons familiar with actuators of robotic end-of-arm-tools will understand the application and can chose the appropriate actuator according to known parameters in view of the present disclosure and the needs of the particular application.

Figure 3:
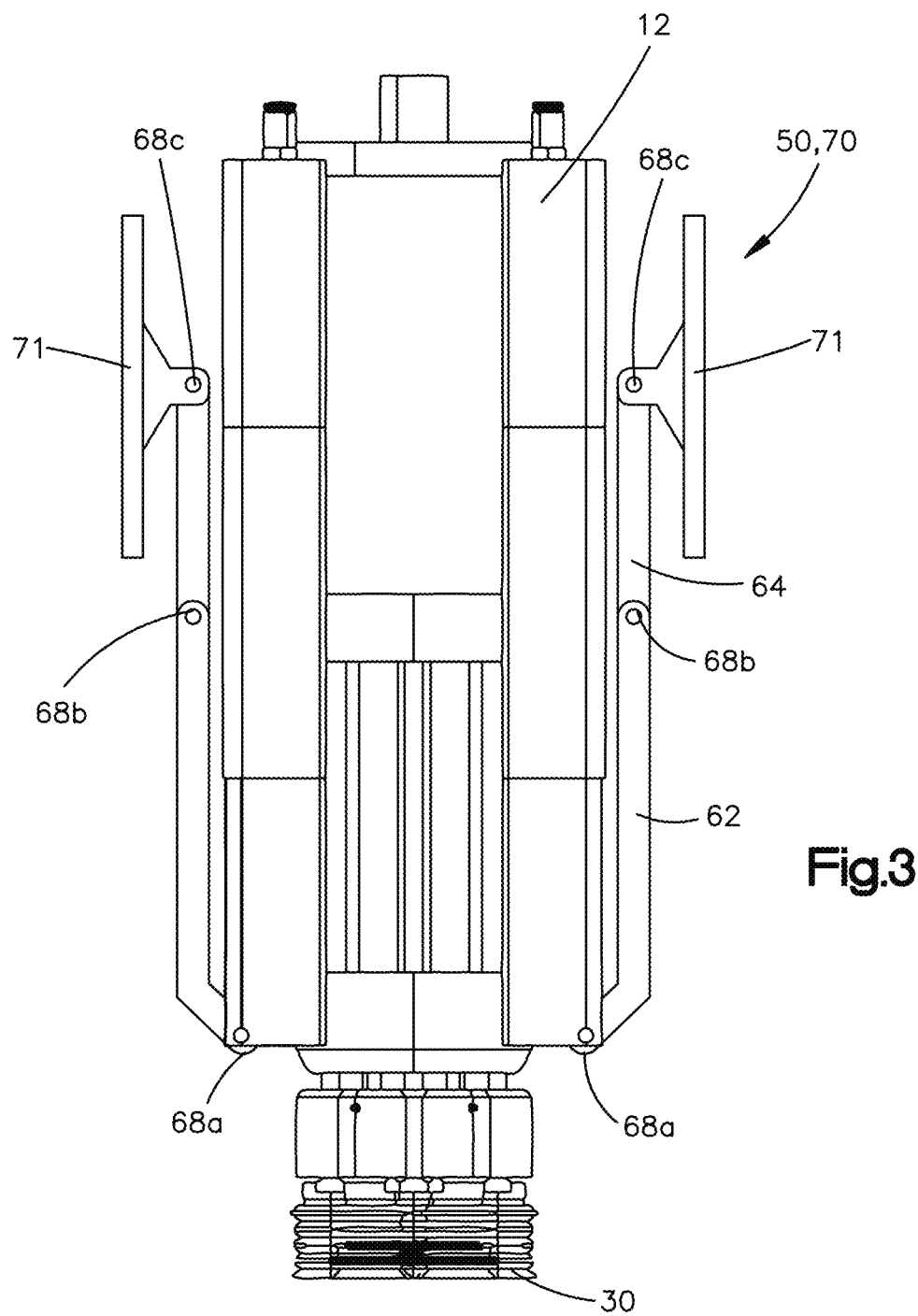
FIG. 3 is a side view of the EOAT of FIG. 2.

In this regard, FIGS. 2 and 3 illustrate the auxiliary arms 50 in the retracted position, which is preferred when the suction cups 24 and 34 are capable of lifting the target item without the need for stabilization, as the EOAT has the smallest profile while arms 50 are retracted.

Figure 4A:
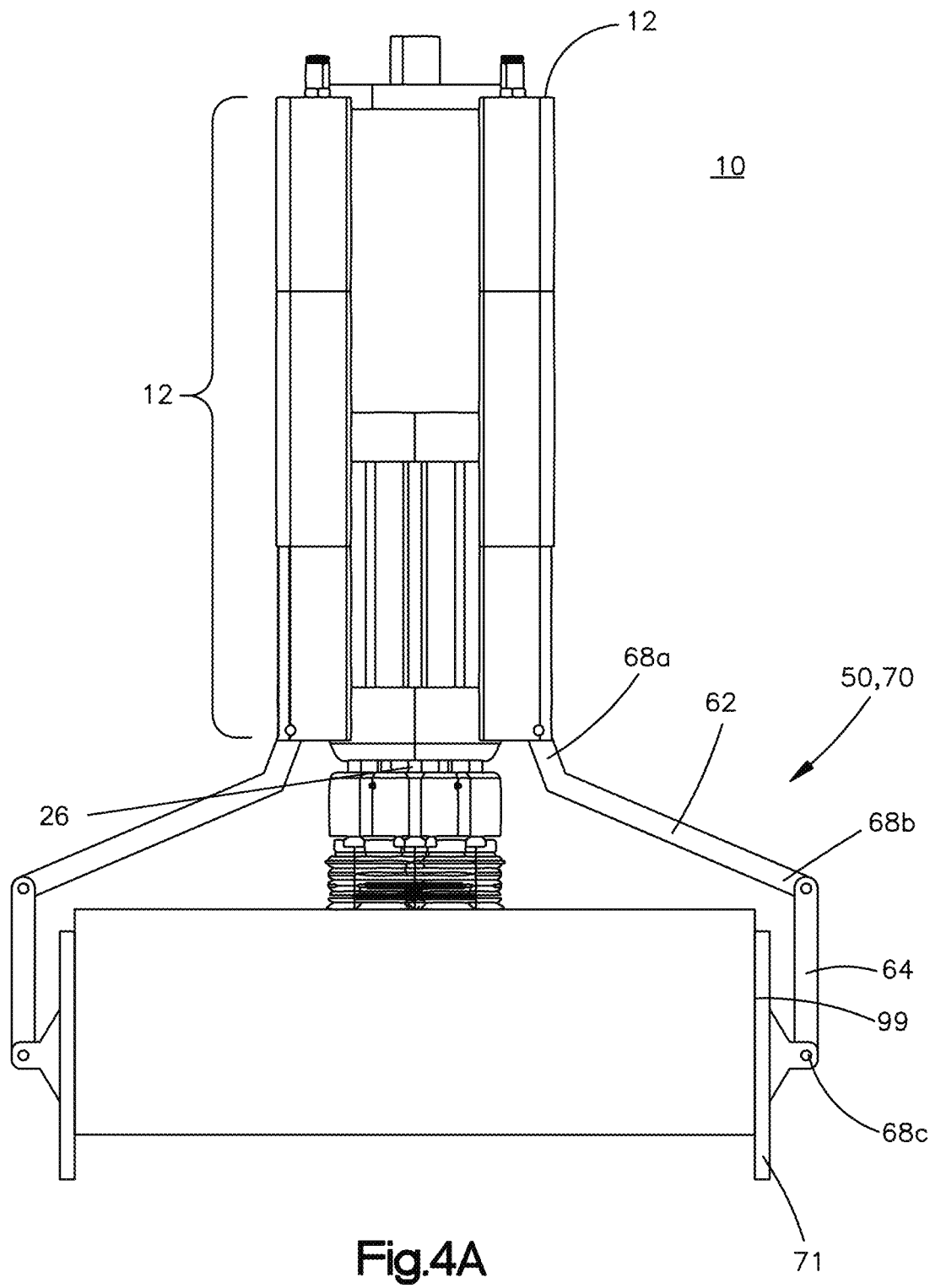
FIG. 4A is a view of the EOAT of FIG. 2 with the auxiliary arms deployed and engaged with a cuboid box during lifting.

FIG. 4A illustrates the arms 50 deployed into a fully engaged position in which contact surfaces of gripper elements 70 contact the side faces of a cuboid box 99. Auxiliary arms 50 are useful in this regard in many circumstances, such as when the suction cups 24/34 are not at the center of the item, when acceleration or deceleration of EOAT 10 is high, or other conditions are present that would tend to shear the item from engagement with the suction cups.

FIG. 4B illustrates the arms 50 engaged with the gripper elements 70 each engaged with a topside surface of the cuboid box 99. Engagement by elements 70 on the top surface can useful to stabilize the box to diminish the propensity of the box to lose contact with the suction cups 24 and 34 by shear.

FIG. 4C illustrates an alternative version EOAT 10' that includes a pair of soft arms 68' that are hinged to the body of EOAT 10'. Soft arms 68' can be flexible, and include suction cups 71' located at distal ends of the arms 68' that are connected to a vacuum source (not shown). Suction cups perform the stabilizing function described herein for gripper element pads 71 when engage with a topside surface of an item. The actuation and control of EOAT 10' can be as described for first embodiment EOAT 10.

Figure 5A:
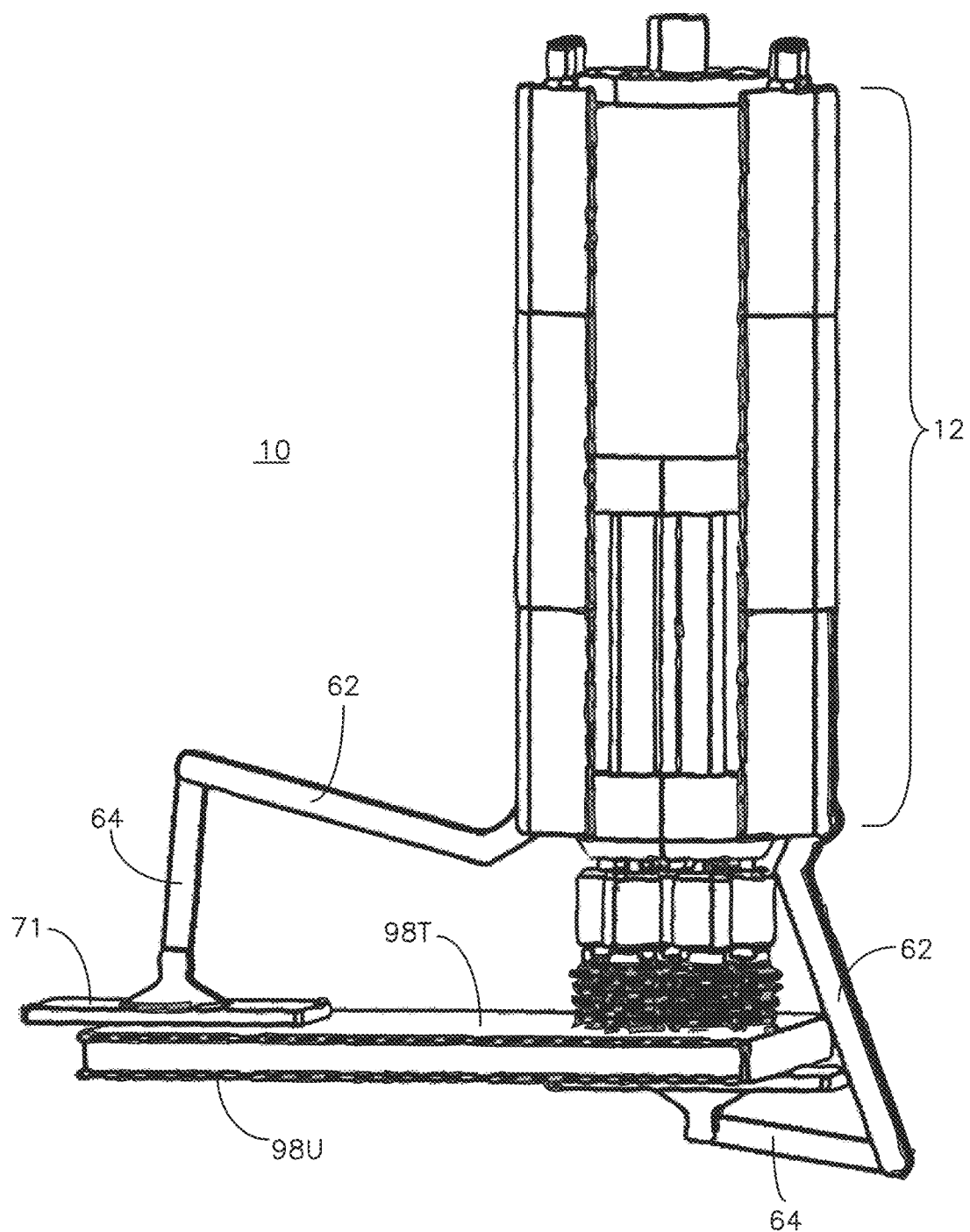
FIG. 5A is a view of the EOAT of FIG. 2 with the auxiliary arms deployed and engaged with a topside and an underside of a thin object, such as a book.

FIG. 5A illustrates arms 50 deployed into a fully engaged position in which the suction cups 24/34 are engaged with a topside 98T of a book near its spine. A first one of the arms 50 (that is, the left arm in FIG. 5) is also engaged with book topside 98T. The opposing, second one of the arms 50 (that is, the right arm in FIG. 5) is engaged with an underside 98U. In practice, auxiliary arm assemblies as described herein can achieve the positions shown in FIGS. 4A, 4B, and 5A without actuators at pivots 68b and 68c. Actuators may also be employed.

Figure 5B:
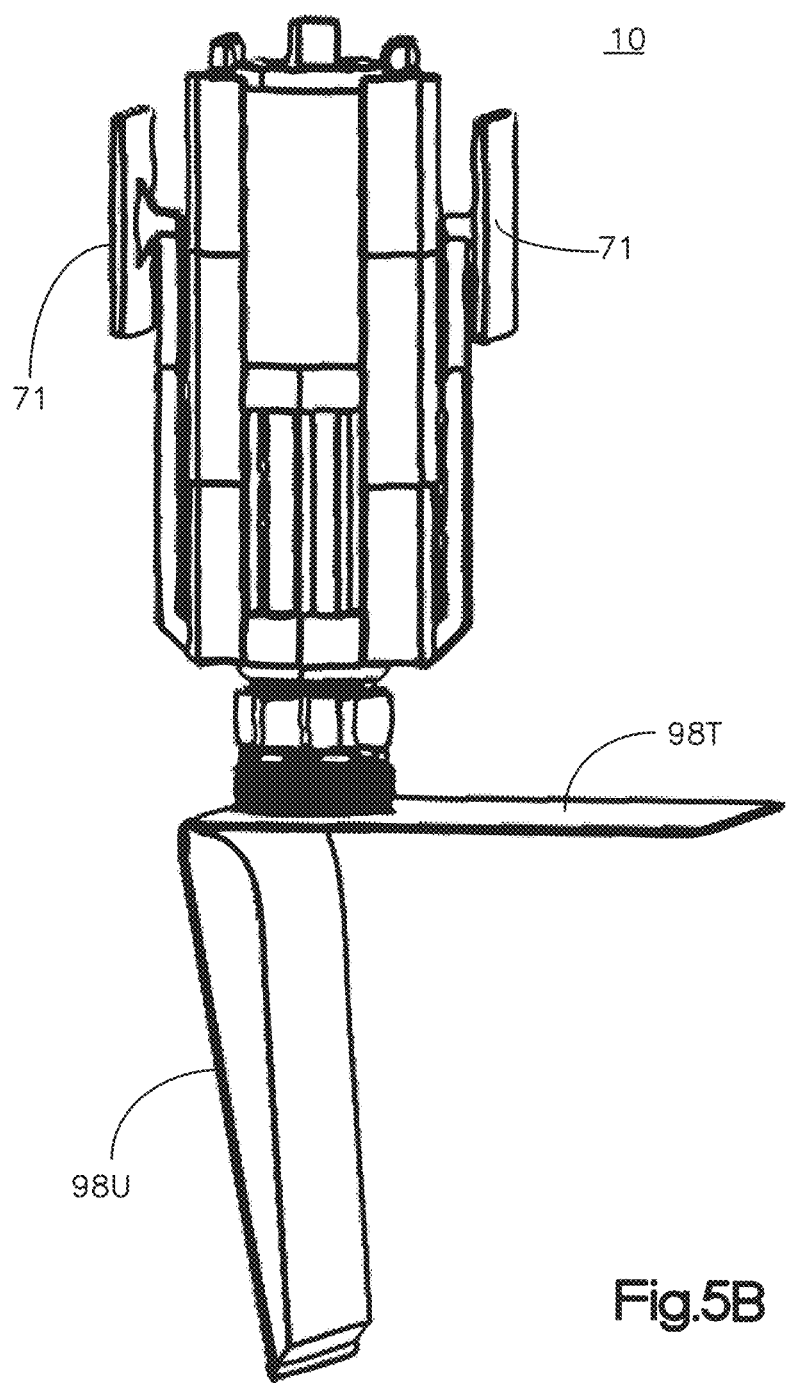
FIG. 5B is a view of the EOAT of FIG. 5A illustrating the book in an open position.

FIG. 5B illustrates an unwrapped book that is gripped near its spine by suction cups 24/34 near its spine. The book has opened by gravity. The open book responds differently to movement of robot arm 102 than would a cuboid item. The stabilizing and related functions of EOAT 10 improve the process of lifting the book. From the position illustrated in FIG. 5B, robot arm 102 can manipulate the book and arm assemblies 50 to achieve the engaged position of the gripper elements 71 of FIG. 5A, and/or actuators 80 may be employed.

Optionally, either or both of pivots 68b and 68c can include actuators, such as a servo motor, or can be biased, such as by a spring (for example a torsion spring), toward the engaged or disengaged position, depending on the particular parameters of the application. Further the dimensions on arms 62 and 64, the dimensions of the gripper elements 70, the location of pivots 68a, and other mechanical aspects can be chosen according to the desired parameters.

Gripper element 70 is illustrated as a flat pad 71 having a contact surface, on which a non-slip material may be applied. Alternatively, gripper element 70 may be a suction cup 72' or 72", as illustrated schematically in FIGS. 9 and 10, which suction cup is connected to a vacuum source to enhance gripping of an item by element 70.

Figure 9:
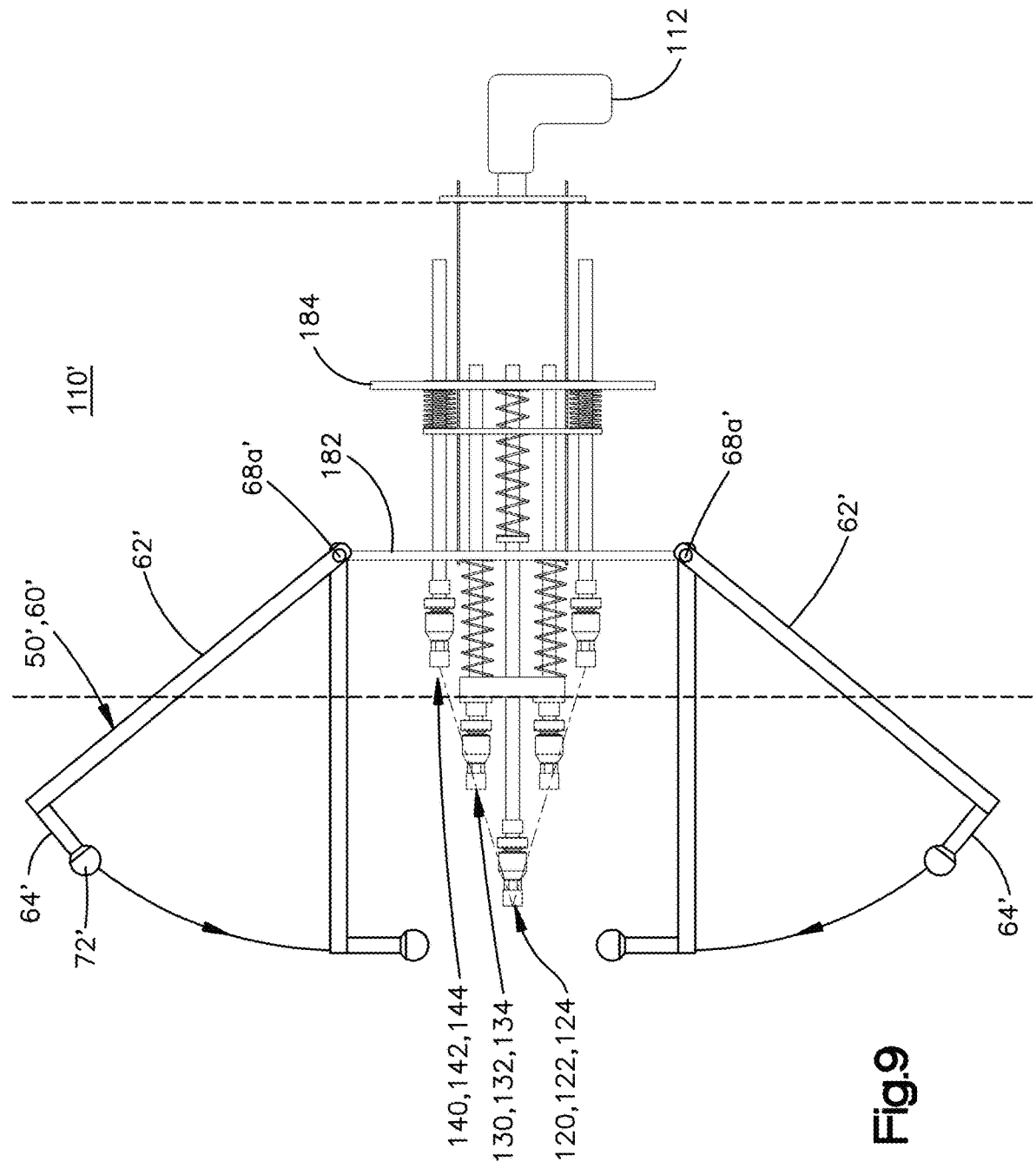
FIG. 9 is a schematic view of the EOAT according to an aspect of the present invention, illustrating the auxiliary arms on the EOAT shown in the center-extended.
Figure 10:
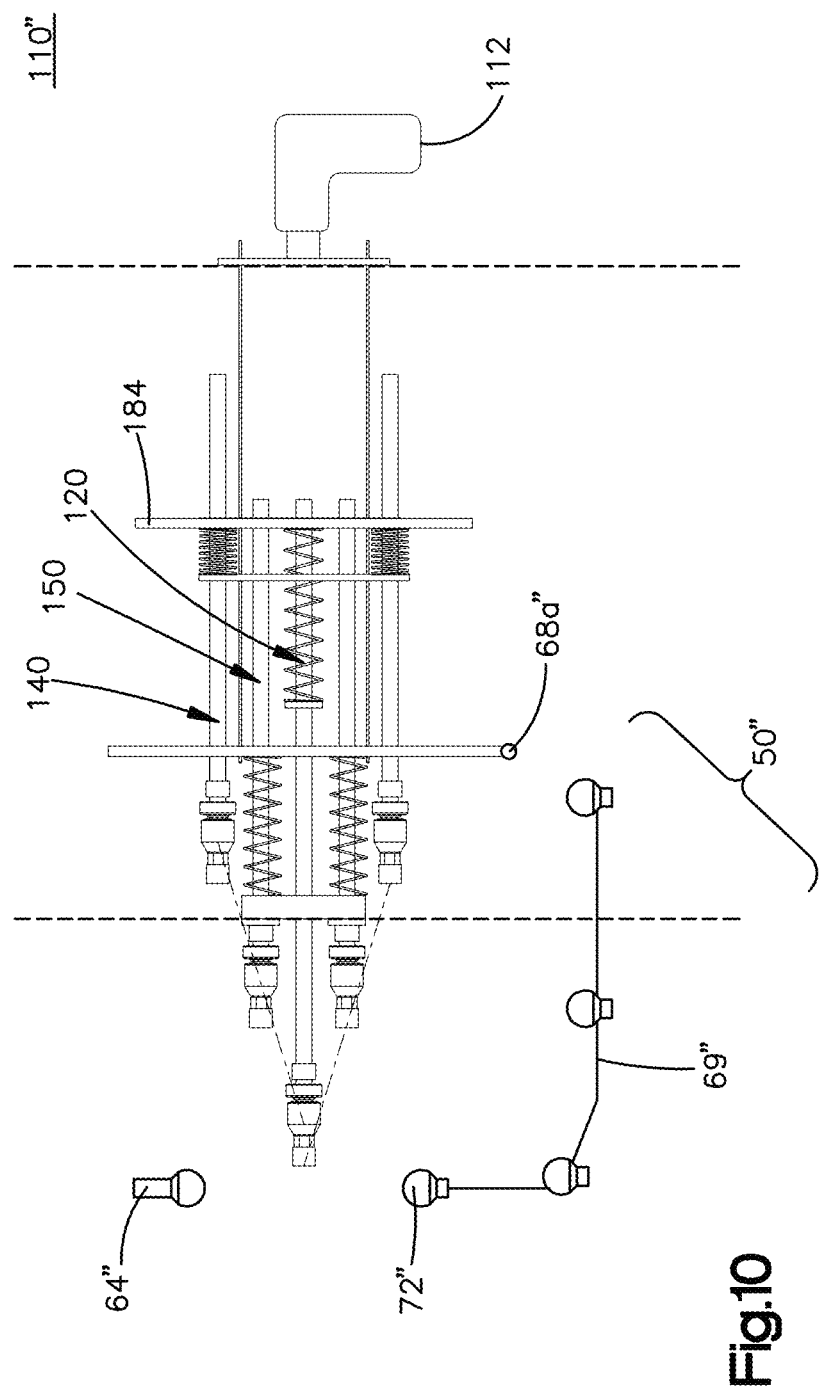
FIG. 10 is a schematic view of another EOAT according to aspects of the present invention, illustrating other embodiments of the auxiliary arms on the EOAT in the center extended position.

FIGS. 9 and 10 schematically illustrate the deployment of arm assemblies. FIGS. 9 and 10 illustrate EOAT 110' and 110", each having a ring 140 of suction cups outboard of first ring 130, as explained more fully below. FIG. 9 illustrates arm 50' and linkages 70' having suction cups 72' at distal ends thereof, and shows an intermediate position in addition to the fully engaged position in which the suction cups 72' face inwardly, corresponding to the side faces of the cuboid shown in FIG. 5. The center suction 120 in FIG. 9 is fully extended into a center-extended position, as ring 130 is partially retracted and ring 140 is fully retracted.

FIG. 10 schematically illustrates in the bottom the that the auxiliary arms 50" are not limited to the linkages illustrates in FIGS. 2-5. For merely one example, a four-bar linkage may be employed such that suction cup 72" faces inboard, smart fingers or soft robotic actuators may be used to position suction cups 72 or pads 71, or any other linkage or actuation may be employed. The suction cups 72' and 72" are illustrated as rigidly attached to arm 64' and 64" at right angles, and other configurations, such as a pivoted configuration and/or suction cups angled relative the arms, are contemplated.

Figure 6:
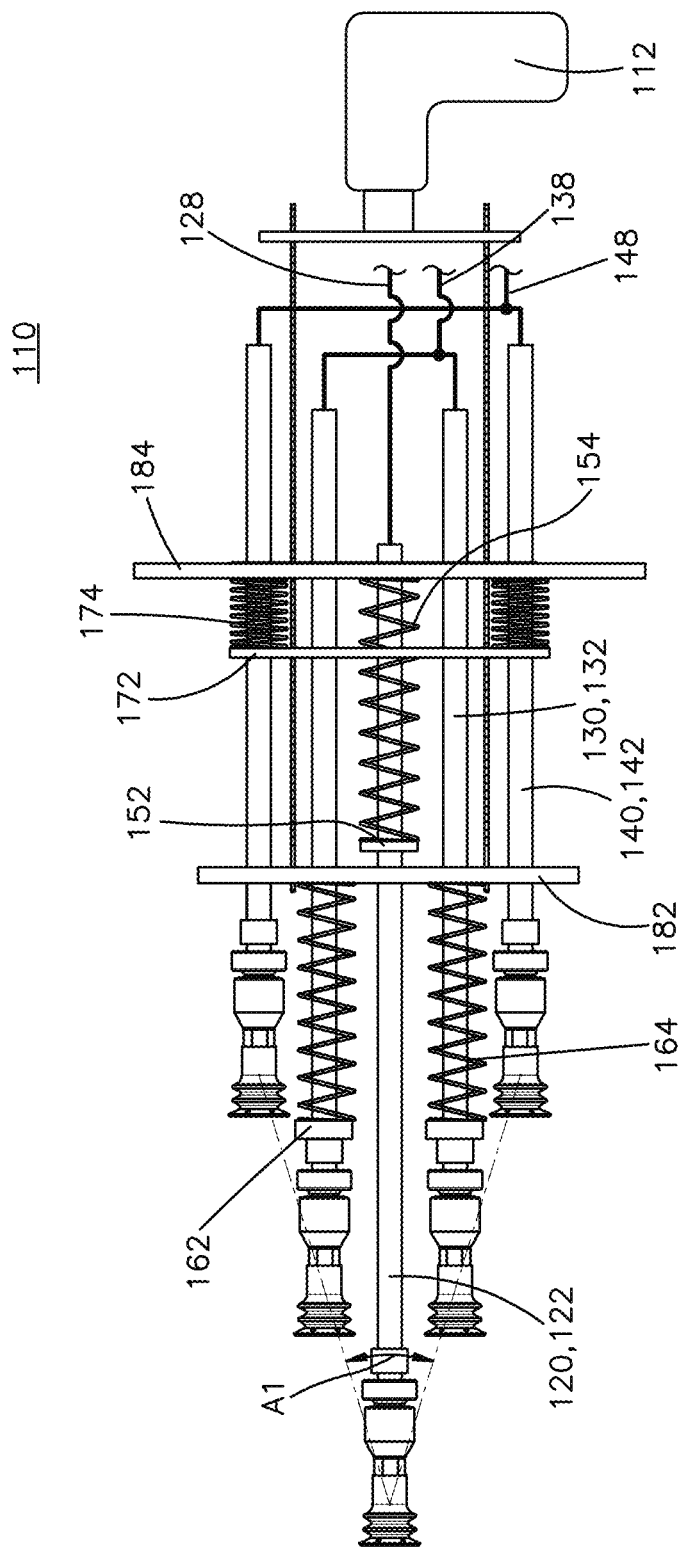
FIG. 6 is a schematic view of an EOAT of the type that can employ auxiliary arms illustrated in FIG. 2, showing the suction cups deployed in a center-retracted configuration in which the center suction cup is retracted relative to surrounding suction cups.
Figure 7:
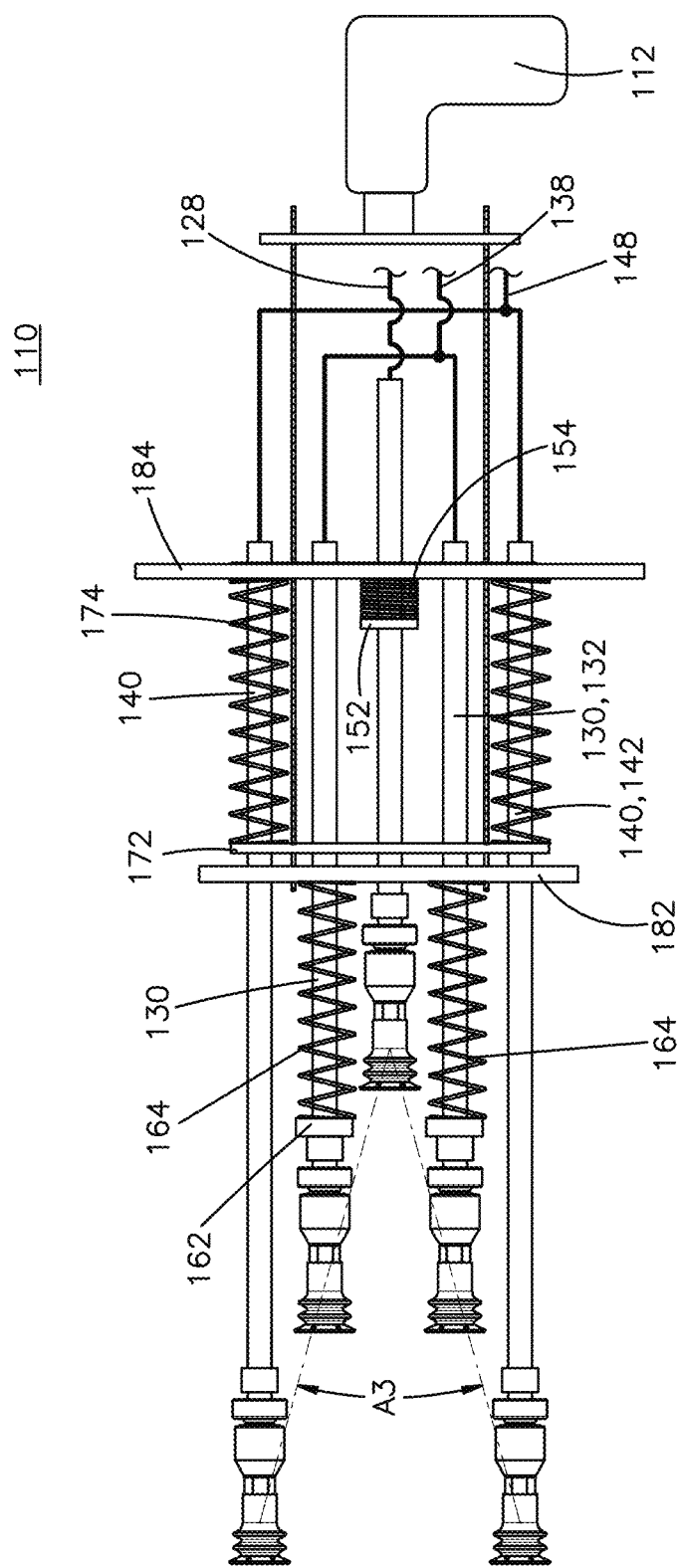
FIG. 7 is a schematic view of the EOAT of FIG. 6 the suction cups deployed into a center-extended configuration in which the center suction cup is extended relative to surrounding suction cups.
Figure 8:
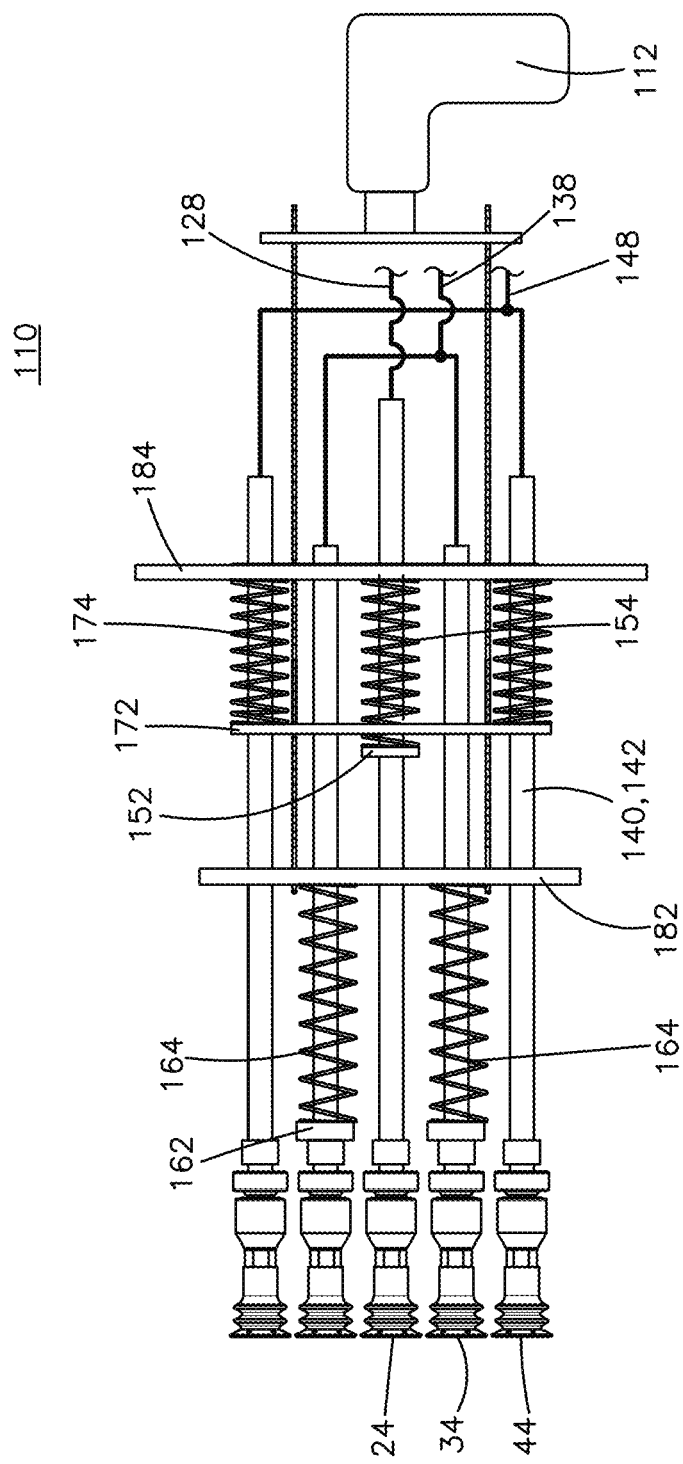
FIG. 8 is a schematic view of the EOAT of FIG. 6, showing the suction cups deployed into a neutral configuration in which the center suction cup is even with surrounding suction cups.

FIGS. 6, 7, and 8 schematically illustrate an EOAT as merely one example of a gripper that can employ auxiliary arms, which are omitted from FIGS. 6-8 for clarity. Reference numbers 110, 110' and 110" are used to refer to the particular configuration of the tool, which includes three rings of suction cups to illustrate that any suction cup configuration is contemplated. Tool 110 includes a center suction cup assembly 120, a ring 130 of second suction cup assemblies 132, and a ring 140 of third suction cup assemblies 142.

FIG. 6 illustrates tool 110 with the center assembly 120 in an extended position, in which ring 130 is also extended relative to ring 140. FIG. 7 illustrates the center assembly 120 retracted relative to ring 130, and ring 130 retracted relative to ring 140. FIG. 8 illustrates center assembly 120 parallel with rings 130 and 140 such that the suction cups are mutually parallel. As will be clear to persons familiar with robotic end effectors, each configuration shown in FIG. 6-8 has its benefits. For example, in the extended position of FIG. 6, the center suction cup assembly 120 can reach into narrow spaces or corners of totes. In the retracted position of FIG. 7, the capability of picking up arcuate or spherical objects may be enhanced. In the neutral position of FIG. 8, the capability of picking up flat objects may be enhanced. Because ring of suction cup assemblies, or alternatively each suction cup assembly, is retractable (such as by spring loading), the suction cups are compliant relative to an item to be lifted.

Center suction cup assembly 120 includes a suction cup 24 at the distal end of a tube 122. Suction cup 24 is illustrated as a bellows type. Other types of suction cups, such as a ring of compliant material, are encompassed by the term "suction cup," as used herein, as will be understood by persons familiar with vacuum-type end effectors. The center suction cup assembly 120 is illustrated as a single suction cup, but the present invention is not limited to a single suction cup at the center, even though a single center suction cup is preferred. For example, the term "center suction cup assembly" encompasses a tightly packed group of suction cups that function together. Suction cup 24 is referred to as "center," as it is at the center of the concentric rings 130 and 140 and preferably on or near the longitudinal centerline of tool 110.

Ring 130 includes multiple suction cup assemblies 132, each of which includes a suction cup 34 and tube 132. Each suction cup 34 and tube 132 is (individually) as described for suction cup assembly 120. Ring 140 includes multiple suction cup assemblies 142, each of which includes a suction cup 44 and tube 142. Each suction cup 44 and tube 142 is (individually) as described for suction cup assembly 20.

Ring 130 is oriented concentrically about center suction cup assembly 120, and ring 140 is oriented concentrically about center suction cup assembly 130 and ring 140. For merely a (non-limiting) example, the suction cup (24, 24, and 44) may have a diameter of one inch with minimal clearance between adjacent suction cups. Other configurations are contemplated. Any number of suction cups per ring and number of rings are contemplated. A pair of plates 182 and 184 support tubes 122, 132, and 142.

Center suction cup assembly 120 is connected to a vacuum source 128, ring 130 is connected to a vacuum source 138, and ring 140 is connected to vacuum source 148 as described above for first embodiment vacuum sources 28, 38, and 48.

Fixed plates 182 and 184 are connected together by rods, and plate 184 is connected through appropriate means to an articulated arm 112. A first compliance mechanism includes a plate 152 and a spring 154. First plate 152 is affixed to center suction cup tube 122. Spring 154 is a coil or helical spring that in the embodiment of FIG. 6 spans between plates 182 and fixed plate 184. Second compliance mechanism includes a plate 162 affixed to each one of ring 130 suction tubes 132. Plate 162 as illustrated in the figures is distal or outboard relative to fixed plate 182. Optionally, plate 162 may be omitted. A spring 164 is a coil or helical spring that spans between plate 162 and fixed plate 182. A third compliance mechanism includes a plate 172 affixed to each one of ring 140 suction tubes 142. A spring 174 is a coil or helical spring that spans between plate 172 and fixed plate 184. Springs 154, 164, and 174 preferably are pre-loaded such that plates 152, 162, and 172 have a longitudinal stop (not shown in the figures). In this regard, each spring 154, 164, and 174 preferably is under compression even in the at-rest state shown in FIG. 5A. It is understood that plates 152 and 172 (and optionally plate 162) are connected to linear actuators (not shown in the figures) of any type.

In the center-extended state shown in FIG. 6, plate 152 is in its distal or extended position, and thus center suction cup assembly 120 is in its extended position. Spring 154 is extended relative to its position in FIGS. 7 and 8. Plate 162 and spring 164 are at a neutral position. Plate 172 is retracted, which retracts outer ring 140 and compresses spring 174 to nearly its maximum extent.

Angle A1 is formed by the suction cup assemblies in the configuration shown in FIG. 6. Angle A1, which is measured through the longitudinal centerlines at the distal tips of the suction cups, preferably is least 10 degrees and less than 180 degrees with the ring of second suction cups, and in the embodiment shown is approximately 32 degrees.

Thus, in operation, arm 112 may move tool 110 (preferably longitudinally relative to the long axis of tool 110) until center suction cup 24 engages the item. Preferably, information about the target item is already stored in or accessible to the control system, or the information is otherwise ascertainable by the computer vision system or the like, such that the weight and shape of the target item is known. For items that have an exposed face that is sufficiently flat to be engaged by center suction cup 24, and that has a weight that is within the capacity of a single suction 24 (based on vacuum pressure, suction cup area, and expected air leakage between the item and suction cup), arm 112 can merely engage the item with suction cup 24. Air flow and/or pressure through tube 122 can be monitored to confirm that the target item is held and lifted.

If the control system determines that the shape and weight of the target item are such that more than center suction cup 24 is required, arm 112 can push tool 110 such that tube 122 and the plate moves longitudinally to compress spring 154 until the ring of suction cups 34 engage the target item. And if the control system determines that addition suction is required, arm 112 can push tool 110 such that tubes 122 and 132 move longitudinally to compress springs 154 and 164.

FIG. 7 illustrates tool 110 in a retracted position in which the concentric suction cup assemblies are in a staggered, retracted configuration, such as may be useful during engaging a spherical, cylindrical, or curved item. As illustrated in FIG. 7, plate 152 is retracted, which retracts center tube 122 and compresses spring 154 to nearly its maximum extent. Plate 162 in the embodiment of the figures does not move such that plate 162 is at or near its rest position (and at or near its position shown in FIG. 6, although this position is not a requirement), and thus suction cup assemblies 130 are extended relative to center suction cup assembly 120. Plate 172 is at or near its fully extended or distal position, which places outer ring 140 in the fully extended position, and distal relative to ring 130.

In operation, the configuration of FIG. 7 may be employed as desired, for example based on information about the target item already stored in or accessible to the control system, or the information is otherwise ascertainable by the computer vision system or the like, such that the weight and shape of the target item is known. Rings 140 and 130, and optionally center assembly 120, can move longitudinally by compression of springs 174, 164, and (optionally) 152 as needed upon engagement of the item, consistent with the control methods explained herein.

Further, springs 154, 164, and 174 may be compressed as needed for tool 110 to conform to the shape of some objects. For example, the assemblies 120, 130, and/or 140 can longitudinally retract when engaging spherical objects, such as an unboxed basketball or medicine ball, or dished objects.

FIG. 8 illustrates tool 110 in its neutral position in which all the suction cups are positioned on a common plane. Plates 152 and 172 are approximately mid-way between retracted and extended positions, such that springs 154 and 174 are partially compressed to position center suction cup(s) of assembly 120 at the same position as the suction cups of outer ring 140. Plate 162 and ring 130 is at the same position shown in FIGS. 6 and 7.

In operation, the configuration of FIGS. 6-8 may be employed as desired, for example based on information about the target item already stored in or accessible to the control system, or the information is otherwise ascertainable by the computer vision system or the like, such that the weight and shape of the target item is known. For many items having a flat surface large enough for all of suction cups 24, 34, and 44 to engage, especially if relatively heavy, the configuration of FIG. 8 may be the desired configuration. Suction cups 24, 34, and 44 are planar, which enables springs 154, 164, and 174 to compress, as needed to conform to the item. Control of the configuration shown in 8 is consistent with the control methods explained herein.

Controlling the circumstances in which auxiliary arms 50 are deployed may be achieved by a wide variety of methods and systems. For example, a vision system or information about a product already known to the control system can determine predetermined items, such as unwrapped books, for which deploying arms 50 is appropriate. The planned acceleration or deceleration of the robot arm 102, the position of the suction cup engagement relative to the geometric center or center of gravity of the item (which may be important when picking items from a crowded environment, such as a tote), weight of the item, and like parameters may also be considered by the control system.

In general, the end effector may be controlled through instructions from the control system. Specifically, the control system may receive input from a human operator and/or a grasp planning program so as to employ custom grasping strategies for various shapes of items. For example, in relation to suction-type end effectors, six-sided boxes with planar surfaces may require only simple grasping strategies regardless of size and orientation. But items with more complex surfaces may be difficult to grasp, especially if these items are disposed in close proximity to other items and objects, such as when multiple items are disposed in a storage container. Items that are relatively difficult to grasp may be actuated using a more complex grasping strategy that is based on characteristics of the item and the item's location relative to other items and objects that the control system receives via system sensors and/or from an item database.

In some embodiments, the control system may receive data from one or more optical sensors disposed on and/or around the end effector. This data will be used by the control system to determine surface shapes of the item and objects near the item. Alternatively, or additionally, the control system may receive data from a database of known item types. For example, data of known item types may describe the item using two or higher dimensional images and/or modes of the item, attributes of the item (e.g., dimensions, weights, center of gravity, etc.), and/or features associated with surfaces of the item (e.g., a surface label, surface or material characteristics, etc.). A two-dimensional image of the item showing a feature may allow an identification of a respective surface. If the two-dimensional image (or a plurality thereof) shows multiple features, relative distances, positions, and orientations of these features may be determined. Generated two dimensional images of an item may be mapped to a multi-dimensional model that enables the control system to determine the relative position and orientation of the item in three-dimensional space. Alternatively, or additionally, the control system may receive data from one or more optical sensors in a scan tunnel disposed upstream of the end effector.

Alternatively, or additionally, the control system may receive data indicating grasping strategies that have been successful or unsuccessful for the same or similar items in the past. Success data may be based on a specific end effector and/or a specific type of end effector. For example, the control system for the end effector may receive success data from the end effector itself, as well as other end effectors with the same or similar design. The known item data may also describe the applied manipulations (e.g., a list of the actions including grasping, moving, retrieving, etc.), related manipulation parameters (e.g., type and amount of force, pressure, voltage, and/or current applied, orientation of an item, etc.), and successes and failures of the applied manipulations (e.g., whether grasping an item was successful, whether scooping the item was unsuccessful, damages resulting from using particular manipulations, end effectors, or forces, etc.).

The control system may weigh data from the end effector itself more heavily than other end effectors with the same design to account for iterative manufacturing differences in the end effectors. The control system may also receive input from a human and/or from one or more sensors regarding which, of two successful grasping strategies, is a better grasp. The control system may employ other data inputs, as well. The control system may employ machine learning on the received data to determine an initial grasping strategy. If unsuccessful, the control system may provide a second grasping strategy based, at least in part, on the data that the initial grasping strategy was unsuccessful. Once a successful grasping strategy is determined, the control system will save to the database data related to the successful strategy for future use by the specific end effector and other end effectors grasping the same or similarly shaped items.

In some embodiments, the robotic manipulation system is able to employ other end effectors having different structural profiles if the first grasping strategy using the first end effector is unsuccessful. The control system can receive success data regarding multiple end effectors, including input from a human and/or from one or more sensors regarding which, of two successful grasping strategies, is a better grasp. The control system will save to the database data related to strategies for grasping when multiple end effectors are available for future use by the specific end effector and other end effectors grasping the same or similarly shaped items.

Data used and gathered by the control system may be exchanged over one or more networks. The networks may include a public data network (e.g., the Internet) and a private data network (e.g., an intranet or a virtual private network (VPN)), wireless or wired, and implementing different communication protocols (e.g., TCP/IP). The network may connect to the specific robotic arm on which the end effector is disposed, as well as other robotic arms.

The term "end of arm" refers to the distal or working end of any kind of end effector, including without limitation a robotic arm, a gantry, and any other configuration capable of positioning the suction cup tool. The EOAT structure and function are described herein by referring to advantages and specific examples or embodiments. The present invention is not limited to the advantages explained herein, nor to the structure or function of the examples or embodiments. Rather, it is intended that the invention be given the full scope of the plain meaning of the claims.

What is claimed:

1. An end-of-arm-tool (EOAT) for a robotic arm for grasping various items, the EOAT comprising:
    a structural body defining a longitudinal axis;
    a suction cup at a distal end of the body that is adapted to grip a topside surface of an item upon application of suction; and
    a pair of opposing auxiliary arms pivotally attached to the structural body at a location proximal to the suction cup each one of the auxiliary arms being moveable relative to the structural body independent of extension of the suction cup, the pair of auxiliary arms having a retracted position and an engaged position;
    wherein the suction cup is attached to an extension that is adapted for longitudinal movement of the suction cup relative to the structural body in a direction of the longitudinal axis, and wherein the suction cup attached to the extension is adapted for longitudinal movement relative to the pair of auxiliary arms in a direction of the longitudinal axis, and
    wherein the auxiliary arms are adapted to be stowed on the structural body when in the retracted position to diminish potential for collision upon movement of the EOAT and adapted to be selectively deployed to engage an item.

2. An end-of-arm-tool (EOAT) for a robotic arm for grasping various items, the EOAT comprising:
    a structural body defining a longitudinal axis;
    at least one suction cup at a distal end of the body, the at least one suction cup being adapted to grip a topside of an item upon application of vacuum to the at least one suction cup; and
    a pair of auxiliary arm assemblies, each one of the auxiliary arm assemblies including:
        a linkage that is pivotally coupled to the structural body at a location proximal to the suction cup and at a proximal end of the linkage, the linkage adapted for being deployed from a retracted position, in which the auxiliary arm assembly is stowed on the structural body to diminish potential for collision upon movement of the EOAT, to an engaged position in, which the auxiliary arm assembly stabilizes the item relative to the suction cup; and
        a gripping element on a distal end of the linkage and adapted for engaging the item when the linkage is in the engaged position;
    wherein the at least one suction cup is adapted to be moved by a rigid extension in a longitudinal direction relative to the structural body, the direction of movement being along the longitudinal axis, and wherein the suction cup is adapted for longitudinal movement relative to the pair of auxiliary arms in the direction of the longitudinal axis without movement of the pair of auxiliary arms relative to the structural body, and
    whereby the EOAT is adapted for retracting the auxiliary arm assemblies when the at least one suction cup alone is suitable of lifting the item, and is adapted for deploying the auxiliary arm assemblies when needed for lifting the item.

3. The EOAT of claim 2 wherein the at least one suction cup is a plurality of suction cups, a center one of the plurality of suction cups being adapted for extending relative other ones on the suction cups.

4. The EOAT of claim 2 wherein the auxiliary arm assemblies are opposing and each one of the linkages includes an upper arm link pivotally connected to a lower arm link; the gripping element being coupled to a distal end of the lower arm link.

5. The EOAT of claim 4 wherein the auxiliary arm assemblies are configured to engage vertical faces of a box when the EOAT engages a box.

6. The EOAT of claim 5 wherein, when the EOAT engages a book, a first one of the auxiliary arm assemblies engages a top side of the book and a second one of the auxiliary arms engages an underside of the book.

7. The EOAT of claim 4 further comprising another pair of opposing auxiliary arm assemblies such that the auxiliary arm assemblies are 90 degrees apart about the structure body.

8. The EOAT of claim 2 wherein the gripping element is flat pad.

9. The EOAT of claim 2 wherein the gripping element is a suction cup that is coupled to a vacuum source.

10. The EOAT of claim 2 further comprising at least one actuator adapted for deploying the auxiliary arm assemblies.

11. The EOAT of claim 10 wherein the actuator is one of a linear actuator, a rotary actuator, a pneumatic actuator, an electric actuator, and a cable means, and wherein the actuator rotates a proximal end of the linkage.

12. The EOAT of claim 2 wherein the linkage is a soft arm.

13. A method of lifting an item by a robotic end-of-arm-tool (EOAT),
    comprising the steps of:
    positioning the EOAT relative to an item;
    engaging a topside surface of the item with a suction cup gripper that is capable of longitudinal extension at a distal end of the EOAT;
    deploying a pair of linkages of auxiliary arm assemblies via pivots located proximal to the suction cup gripper from a retracted position to an engaged position in which gripper elements at distal ends of linkages engage and stabilize the item without movement of the suction cup gripper relative to a structural body of the EOAT, wherein at least one gripper element provides a force on the item opposite the suction cup gripper; and
    retracting the auxiliary arm assemblies, after the deploying step, into the retracted position and stowing the auxiliary arm assemblies on an upper body of the EOAT, thereby enhancing maneuverability of the EOAT and diminishing potential for collision upon movement of the EOAT.

14. The method of claim 13 wherein the deploying step includes moving the linkages by an actuator.

15. The method of claim 14 wherein the step of deploying the linkages includes moving a proximal arm of the linkage and by the actuator that is one of a linear actuator, a rotary actuator, a pneumatic actuator, an electric actuator, and a cable means, and wherein the actuator rotates a proximal end of the linkage.

16. The method of claim 14 wherein the retracting step includes moving the linkage toward the retracted position via the actuator.

17. The method of claim 14 wherein, when the item is a book, the deploying step includes each one of a first one of the gripper elements and the suction cup gripper engaging a topside of the book, and a second one of the gripper elements engaging an underside of the book.

18. The method of claim 14 wherein, when the item is a cuboid, the deploying step includes the gripper elements engaging opposing side faces of the cuboid.

\* \* \* \* \*